C. K. LASSITER.
MILLING CUTTER.
APPLICATION FILED FEB. 17, 1920.
1,359,179.
Patented Nov. 16, 1920.
- FIG. 1. -
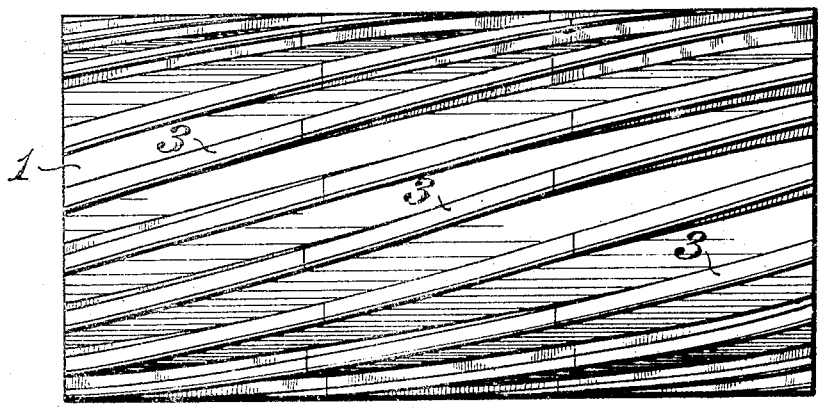
- FIG. 2. -
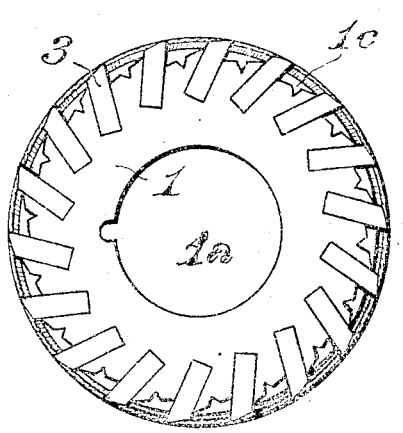
- FIG. 3. -
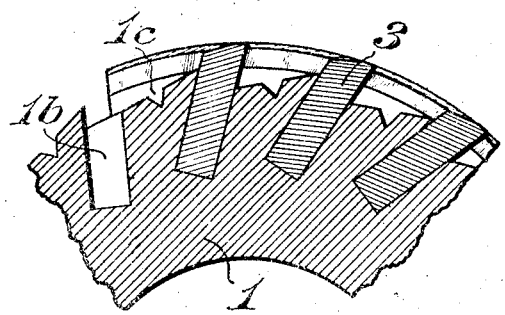
- FIG. 4. -
- FIG. 5. -
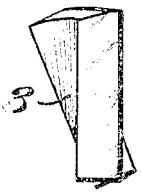
WITNESSES
Edward Wright
S. R. Bell
INVENTOR
C. K. Lassiter

UNITED STATES PATENT OFFICE.

COLUMBUS K. LASSITER, OF RICHMOND, VIRGINIA.

MILLING-CUTTER.

1,359,179.

Specification of Letters Patent.

Patented Nov. 16, 1920.

Application filed February 17, 1920. Serial No. 359,224.

*To all whom it may concern:*

Be it known that I, COLUMBUS K. LASSITER, of Richmond, in the county of Henrico and State of Virginia, have invented a certain new and useful Improvement in Milling-Cutters, of which improvement the following is a specification.

My invention relates to milling cutters of the inserted tooth type, and its object is to provide an appliance of such type by which a continuous helical cut may be made in slabbing, with reduced friction and operating power, as compared with prior constructions, and in which the cutting blades shall be firmly locked in operative position, with the capacity of ready removal and insertion as required.

The improvement claimed is hereinafter fully set forth.

In the accompanying drawings: Figure 1 is a side view, in elevation, of a milling cutter embodying my invention; Fig. 2, an end view of the same; Fig. 3, a partial transverse section, on an enlarged scale; Fig. 4, a top view of a cutting blade; and Fig. 5, an end view of the same.

In the practice of my invention, referring descriptively to the specific embodiment thereof which is herein exemplified, I provide a cylindrical cutter head or hub, 1, of any suitable metal, as, preferably, high carbon steel, containing about 3 per cent. of nickel, which may either be integral or be made up of a plurality of sections, dependent upon the desired length of the appliance, the cutter head having a central bore, 1ª, for the passage of a suitable driving mandrel.

A plurality of peripheral grooves, 1ᵇ, of helically curved form, and rectangular transverse section, that is to say, having parallel sides, is accurately cut, to a proper depth and width, in the cutter head, and a correspondingly curved drop forged blade or cutter, 3, having parallel sides, *i. e.*, of quadrangular section, is fitted neatly in each of said grooves. The cutter blades are pressed into the grooves, 1ᵇ, in which they are held with a driving fit, by their conformity with the width and curvature thereof, and they may, if desired, be tightened therein by swaging the metal of the cutter head against them, to facilitate which operation, shallow peripheral notches, 1ᶜ, may be cut in the head, between the cutter receiving grooves, 1ᵇ. In cases where the appliance is of such length as to require each cutting blade to comprise a plurality of sections, those of the alternate sets are made of slightly different lengths so as to break joints, as shown in Fig. 1.

It has heretofore been the practice to lock the inserted helical cutting blades of long milling cutters to the heads or hubs thereof, by pouring metal between their sides and inclined sides formed on the grooves, and also to secure them in position by expansible wedging devices. The objections to these fastening means are obviated, and the construction of the appliance simplified and economized by my invention, as above described.

I claim as my invention and desire to secure by Letters Patent:—

1. The combination, in a milling cutter, of a cylindrical cutter head or hub, having a plurality of helically curved and parallel sided peripheral grooves; and a plurality of correspondingly curved cutting blades, each having parallel sides, and of corresponding width with a groove of the cutter head, and engaging throughout its length, with the walls thereof, with a driving fit.

2. The combination, in a milling cutter, of a cylindrical cutter head or hub, having a plurality of helically curved and parallel sided peripheral grooves, and a plurality of peripheral notches, interposed between said grooves; and a plurality of correspondingly curved cutting blades, each having parallel sides, and of corresponding width with a groove of the cutter head, and engaging, throughout its length, with the walls thereof, with a driving fit.

COLUMBUS K. LASSITER

Witnesses:
J. H. LINK,
ROSS ANDERSON.